Patented Oct. 21, 1930

1,779,367

UNITED STATES PATENT OFFICE

HERMAN ALEXANDER BRUSON, OF PHILADELPHIA, PENNSYLVANIA, ASSIGNOR TO THE RESINOUS PRODUCTS & CHEMICAL COMPANY, A CORPORATION OF DELAWARE

CONDENSATION PRODUCT AND PROCESS FOR PREPARING SAME

No Drawing. Application filed October 8, 1928. Serial No. 311,256.

This invention relates to a new class of plastic substances possessing elastic properties, and has as its main object the preparation of hitherto unknown organic materials characterized by extraordinary toughness, flexibility, and softness.

It has been known in the past that many polybasic acids such as phthalic, succinic, glutaric, malic, maleic, malo-malic, furmaric, tartaric and citric, unite with polyhydric alcohols, notably glycerol, to form resins. Such reaction products are at first sirupy liquids but eventually become friable resinous masses of varying degrees of hardness. In every case they form brittle, hard resins when the condensation is carried to completion.

I have made the discovery however, that certain higher polybasic acids which contain a minimum of six carbon atoms linked together in a straight chain, as for example in adipic acid, do not give such resins, but form soft, rubbery, plastic masses which are never hard, brittle, or friable. They possess great interest and practical value inasmuch as they are completely compatible with nitrocellulose and other cellulose esters, and confer upon these substances the property of ususual flexibility, elasticity, and toughness such as can not be duplicated by the use of other plasticizing or flexibilizing agents.

The above mentioned soft, elastic condensation products are formed when a polyhydric alcohol such as glycerol is heated preferably in molecular proportions with any one of the higher aliphatic dibasic acids containing at least six carbon atoms in a straight chain; these acids being any one of the following, to wit:

| Acid | Formula |
|---|---|
| Adipic | $HOOC-(CH_2)_4-COOH$ |
| Pimelic | $HOOC-(CH_2)_5-COOH$ |
| Suberic | $HOOC-(CH_2)_6-COOH$ |
| Azelaic | $HOOC-(CH_2)_7-COOH$ |
| Sebacic | $HOOC-(CH_2)_8-COOH$ |

The condensation of these acids with a polyhydric alcohol takes place in three stages:

*Stage "A"*.—Initial condensation product; thin sirup, soluble in acetone.

*Stage "B"*.—Intermediate product; soft, flexible, tacky, rubbery mass; soluble in acetone or ethyl acetate, but insoluble in benzol.

*Stage "C"*.—Final product; soft, flexible, elastic, very tough solid; insoluble in the common organic solvents.

In no case is a hard, brittle, or friable resin produced such as is obtained by heating polyhydric alcohols with the other polybasic acids of aliphatic or aromatic nature hitherto employed in the art.

The methods of preparation of our soft, elastic condensation products may be briefly described as follows, it being understood that the reactions cited are typical for any one of the acids of the homologous series ranging from adipic acid to sebacic acid as mentioned hereinabove, and including any possible mixture of two or more of these acids.

Adipic acid and glycerol 1 mole equivalent glycerol (92 parts by weight) and 1½ mole equivalents adipic acid (219 parts by weight) are placed in a capacious vessel and heated in an oil bath gradually to 165–170° C. The temperature is kept at this point, removing samples from time to time, until a condensation product having the desired consistency is obtained. The period of heating depends upon the size of the batch. Considerable water and gases are evolved and it is desirable to employ stirring throughout the condensation process in order to obtain a uniform product. After a period of heating ranging from 1 hour to 5 hours at 165–170° C. a condensation product ranging from the soluble, "B" stage to the insoluble "C" stage is obtained depending upon when the reaction is stopped. The soluble form is usually complete at the end of 1½ hours, whereas if carried further, formation of the insoluble product sets in.

Sebacic acid and glycerol

The reaction of glycerol with sebacic acid is quite analogous to that of adipic acid and glycerol except that the higher molecular weight sebacic acid requires a longer time for reaction.

1 mole equivalent glycerol (92 parts by weight) and 1½ mole equivalents sebacic acid (303 parts by weight) are heated as above at 165-170° C. The mixture is carefully held at this point until a sample when removed sets to firm jelly on cooling. The length of time of heating for a batch using ⅕ of the above quantities, necessitates about 4½ hours to complete stage "A". At the end of 4¾ hours the "B" stage is completed, and further heating for ½ hour yields the insoluble "C" stage. The reaction may also be carried out at higher temperatures say at 190°-200° C. but the reaction is more difficult to control as the tendency is very great for the "B" stage to pass over into the "C" stage product. I have found that reactions carried out at lower temperatures for a longer period of time give a more uniform product.

Instead of adipic acid or sebacic acid any one of the other acids mentioned, namely, pimelic, suberic, or azelaic may be used in corresponding amount, to form condensation products having similar properties.

All of the soluble products obtained are compatible with nitrocellulose in butyl acetate-toluol solution and give therewith transparent, flexible films which are elastic and capable of being stretched to an extraordinary degree without the use of other plasticizing agents. They are considerably more water resistant than are the glycerol esters of the lower polybasic acids such as succinic, citric, etc.

Instead of glycerol, other polyhydric alcohols may be used such as polyglycerol, diethylene glycol, triethylene glycol, and ethylene glycol. Quantities other than those indicated may also be used, although it is best not to deviate considerably from the theoretically calculated quantities necessary to react with all the hydroxy groups of the polyhydric alcohol. Diethylene glycol has a tendency to form dark colored products which are not as tough as those obtained from glycerol or polyglycerol. Ethylene glycol reacts very slowly and requires about 30 hours at 240° C. to yield a condensation product with sebacic acid.

The soluble "B" stage condensation products and the insoluble "C" stage products may be hardened by dissolving them in various natural and synthetic resins such as colophony, shellac, ester gum, Congo gum as well as in the reaction products of phenol and formaldehyde to yield hard resins which retain a certain degree of the toughness and flexibility inherent in the original "B" and "C" stage products described above.

From the description hereinabove set forth, it will be understood that the principles of my invention are neither limited to the specific proportions indicated nor to the use of only one dibasic acid upon one alcohol, but it will be appreciated by those skilled in the art that mixtures of any two or more dibasic acids enumerated above and containing six or more carbon atoms in a straight chain may be employed upon any mixture of the above mentioned polyhydric alcohols without departing from its scope, and also that temperatures different from those indicated, may be employed.

I claim:

1. A composition of matter comprising a reaction product of a polyhydric alcohol and a straight-chain aliphatic acid having the structural formula

where $n$ is a whole number between 5 and 8 inclusive.

2. A composition of matter comprising a reaction product of glycerol and a straight-chain aliphatic acid having the structural formula

where $n$ is a whole number between 5 and 8 inclusive.

3. A composition of matter comprising a reaction product of a polyhydric alcohol and sebacic acid.

4. A composition of matter comprising a reaction product of glycerol and sebacic acid.

5. A composition of matter comprising the reaction product of polyglycerol and a straight chain aliphatic acid having the structural formula

where $n$ is a whole number between 5 and 8 inclusive.

6. A composition of matter comprising the reaction product of polyglycerol and sebacic acid.

7. A composition of matter comprising the reaction product of diethylene glycol and a straight chain aliphatic acid having the structural formula

where $n$ is a whole number between 5 and 8 inclusive.

8. A composition of matter comprising the reaction product of diethylene glycol and sebacic acid.

9. A process for preparing a resin which comprises heating to reaction temperature a polyhydric alcohol and a straight chain aliphatic acid having the structural formula

where $n$ is a whole number between 5 and 8 inclusive.

10. A process for preparing a resin which comprises heating to reaction temperature glycerol and a straight chain aliphatic acid having the structural formula

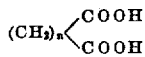

where $n$ is a whole number between 5 and 8 inclusive.

11. A process for preparing a resin which comprises heating to reaction temperature a polyhydric alcohol and sebacic acid.

12. A process for preparing a resin which comprises heating to reaction temperature glycerol and sebacic acid.

13. A process of preparing a resin which comprises heating to reaction temperature polyglycerol and a straight chain aliphatic acid having the structural formula

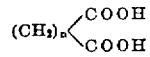

where $n$ is a whole number between 5 and 8 inclusive.

14. A process of preparing a resin which comprises heating to reaction temperature diethylene glycol and a straight chain aliphatic acid having the structural formula

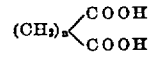

where $n$ is a whole number between 5 and 8 inclusive.

HERMAN ALEXANDER BRUSON.

DISCLAIMER 1,779,367.—*Herman Alexander Bruson*, Philadelphia, Pa. CONDENSATION PRODUCT AND PROCESS FOR PREPARING SAME. Patent dated October 21, 1930. Disclaimer filed June 2, 1934, by the patentee, the assignee, *The Resinous Products & Chemical Company*, approving.

Hereby enters disclaimer to the following parts of the specification and claims, namely:

1. Page 2 of the specification, lines 37 and 38, the following: "diethylene glycol, triethylene glycol and ethylene glycol"; page 2 of the specification, line 43 through line 49, the following: "Diethylene glycol has a tendency to form dark colored products which are not as tough as those obtained from glycerol or polyglycerol. Ethylene glycol reacts very slowly and requires about 30 hours at 240° C. to yield a condensation product with sebacic acid".

2. All the claims, except as they are read with the words "consisting of" in place of the word "comprising".

3. The subject matter of the following claims: 1, 3, 9, and 11, except as they are read to exclude glycols.

[*Official Gazette June 26, 1934.*]

comprises heating to reaction temperature glycerol and a straight chain aliphatic acid having the structural formula

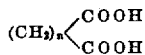

where $n$ is a whole number between 5 and 8 inclusive.

11. A process for preparing a resin which comprises heating to reaction temperature a polyhydric alcohol and sebacic acid.

12. A process for preparing a resin which comprises heating to reaction temperature glycerol and sebacic acid.

13. A process of preparing a resin which comprises heating to reaction temperature polyglycerol and a straight chain aliphatic acid having the structural formula

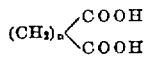

where $n$ is a whole number between 5 and 8 inclusive.

14. A process of preparing a resin which comprises heating to reaction temperature diethylene glycol and a straight chain aliphatic acid having the structural formula

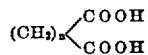

where $n$ is a whole number between 5 and 8 inclusive.

HERMAN ALEXANDER BRUSON.

DISCLAIMER 1,779,367.—*Herman Alexander Bruson*, Philadelphia, Pa. CONDENSATION PRODUCT AND PROCESS FOR PREPARING SAME. Patent dated October 21, 1930. Disclaimer filed June 2, 1934, by the patentee, the assignee, *The Resinous Products & Chemical Company*, approving.

Hereby enters disclaimer to the following parts of the specification and claims, namely:

1. Page 2 of the specification, lines 37 and 38, the following: "diethylene glycol, triethylene glycol and ethylene glycol"; page 2 of the specification, line 43 through line 49, the following: "Diethylene glycol has a tendency to form dark colored products which are not as tough as those obtained from glycerol or polyglycerol. Ethylene glycol reacts very slowly and requires about 30 hours at 240° C. to yield a condensation product with sebacic acid".

2. All the claims, except as they are read with the words "consisting of" in place of the word "comprising".

3. The subject matter of the following claims: 1, 3, 9, and 11, except as they are read to exclude glycols.

[*Official Gazette June 26, 1934.*]

DISCLAIMER 1,779,367.—*Herman Alexander Bruson*, Philadelphia, Pa. CONDENSATION PRODUCT AND PROCESS FOR PREPARING SAME. Patent dated October 21, 1930. Disclaimer filed October 18, 1934, by the patentee, and the assignee, *The Resinous Products & Chemical Company*, approving.

Hereby enters disclaimer to the following parts of the specification and claims, namely:

1. Claims 5, 6, 7, 8, 13, 14.
2. Claims 1, 3, 9, 11 except as they are read to exclude polyglycerol.

[*Official Gazette November 13, 1934.*]